United States Patent [19]

Yamada

[11] 4,288,874
[45] Sep. 8, 1981

[54] TIMING DATA REPRODUCTION SYSTEM

[75] Inventor: Kunihiro Yamada, Tokyo, Japan

[73] Assignee: Ricoh Co., Ltd., Tokyo, Japan

[21] Appl. No.: 37,486

[22] Filed: May 9, 1979

[30] Foreign Application Priority Data

May 15, 1978 [JP] Japan ................................. 53/56673

[51] Int. Cl.³ ..................................................... H04L 7/00
[52] U.S. Cl. ...................................... 375/118; 375/119
[58] Field of Search .......................... 178/88; 329/122; 331/1 A; 375/118, 119

[56] References Cited

U.S. PATENT DOCUMENTS

| 4,010,323 | 3/1977 | Peck ..................................... | 329/122 |
| 4,019,149 | 4/1977 | Kustka ................................. | 178/88 |
| 4,117,419 | 9/1978 | Rudd ................................... | 331/1 A |
| 4,121,170 | 10/1978 | Hartmann ........................... | 331/1 A |
| 4,151,485 | 4/1979 | Lafratta ............................... | 331/1 A |

Primary Examiner—Harold I. Pitts
Attorney, Agent, or Firm—Burgess, Ryan and Wayne

[57] ABSTRACT

A system for generating from the incoming digital data signal the timing data required for sampling the data signal. A shift register is provided to phase the sampling clock with the incoming digital signal and generate a phase difference signal which is applied to a variable-frequency or variable phase oscillator so as to control its output frequency or phase, thereby synchronizing the sampling clock pulse with the incoming data signal. The output from the oscillator is used as the sampling clock.

8 Claims, 15 Drawing Figures

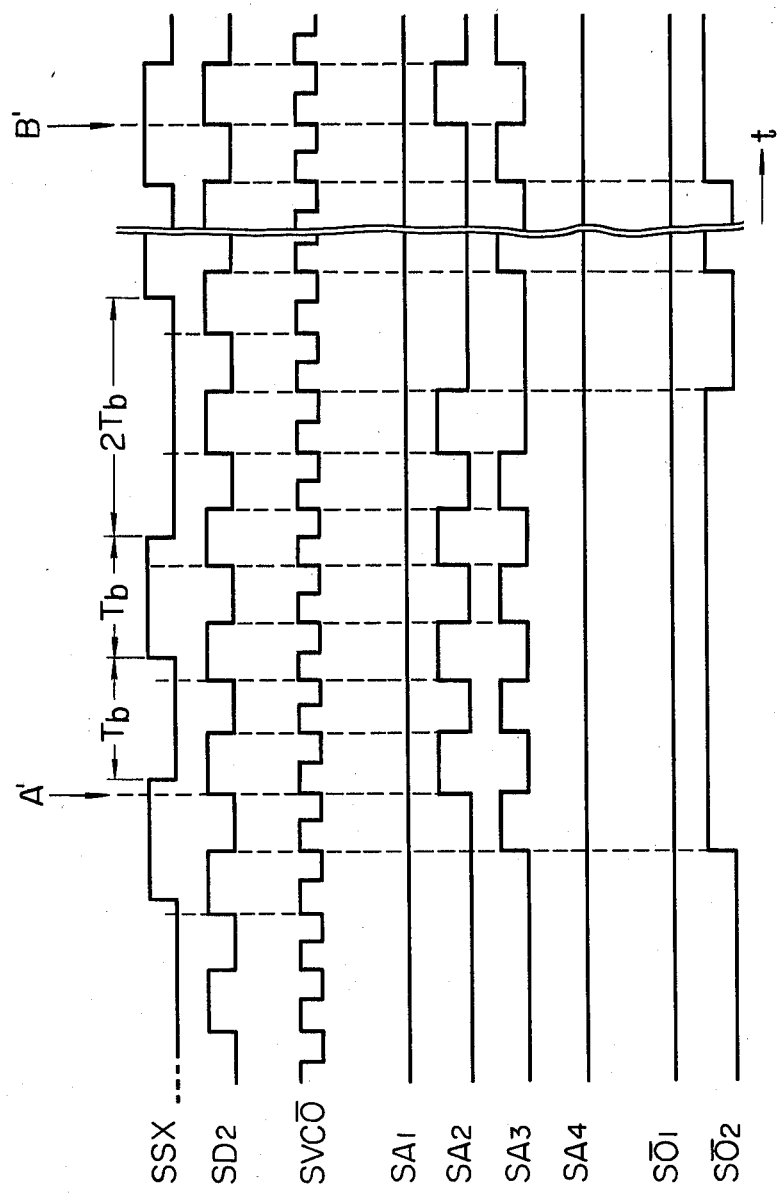

TIMING DATA REPRODUCTION SYSTEM

BACKGROUND OF THE INVENTION

The present invention relates to a timing data reproduction system for a digital receiver.

In digital communications utilizing frequency shift keying (FSK), only the digital signal is transmitted so that the timing data required for sampling the incoming data signal must be generated in a receiver so as to decode the incoming data signal correctly.

To this end, there has been devised and demonstrated a system using a pilot tone signal. That is, when a telephone circuit or line is used for data transmission, the carrier is modulated in a suitable manner so as to transmit the data. A pilot tone is transmitted on an idle frequency band which is not used for the data transmission. At the receiving side, in response to this pilot tone the timing data for sampling is received.

Since the data and the pilot tone are sent by different frequency bands, in addition to a data receiver an additional receiver for receiving the pilot tone must be provided. Thus the pilot tone system is disadvantageous in that it is very complicated in construction.

There has also been devised and demonstrated a system wherein the zero-crossings of the received baseband signal are directly detected or the transition points of the two-valued signal obtained by the reshaping of the received signal so as to control the frequency or phase of a local oscillator which generates the sampling timing clock, thereby synchronizing the sampling clock with the incoming data signal. This system has also some problems as will be described below.

In the zero-crossing detection system, all of the signals to be processed cannot be digitized because the analog signal must be used for the zero-crossing detection. In the system wherein the transitions of the two-valued signal, the differentiation of the signal is needed for the direct transition detection. In order to overcome this problem, there may be considered to detect the transition time points by means of the digital sampling, but this is possible only at a considerably high sampling frequency. Furthermore, in the case of the ultra-high speed data transmission through for instance an optical transmission line, it would be extremely difficult to obtain directly the time relationship between the zero-crossings and the sampling time points. Even in the case of the low-speed data transmission through telephone networks with FSK modes, the incoming data signal must be sampled at a frequency considerably higher than the baud rate of the incoming data signal in order to detect the baud timing data. If it is attemped to process all these operations with the use of a microcomputer in full-digital manner, the overhead of the microcomputer would be inhibitively increased. For instance, assume that the transmission speed be 600 bauds and 16 samplings be made for one baud. Then one sampling must be executed in such a short time as $1/(600 \times 16) \approx 104 \times 10^{-6}$ seconds. Such high sampling speed surpasses even a highest processing speed of the microcomputer.

There is also known a timing data reproduction system of the type using a squaring circuit and a narrow-band filter. However the narrow-band filter must have a high Q and must be correctly tuned to the frequency of a predetermined baud rate. When the Q factor is too low, the reproduced timing signal will be considerably adversely affected by jitter. When the narrow-band filter is not correctly tuned, off-set of the phase of the reproduced timing signal will occur, resulting in phase error. In addition, in order to attain in the form of an analog circuit a narrow-band filter which has a high Q factor and is correctly tuned, the timing data reproduction system needs component parts which must operate at an extremely higher degree of accuracy in an extremely highly reliable and dependable manner. In addition, the system would require a large number of ALUs, thus increasing the cost.

SUMMARY OF THE INVENTION

One of the objects of the present invention is therefore to provide a timing data reproduction system which is extremely simple in construction and may find easier applications in various fields.

As herein described, the present invention provides a timing data reproduction system comprising a shift register and an oscillator of the type whose output frequency or phase may be controlled in response to the input, whereby the timing data for sampling may be derived from the incoming data signal.

BRIEF DESCRIPTION OF THE DRAWINGS

FIGS. 14 and 15 are timing charts used for the explanation of the mode of operation of the seventh embodiment for synchronizing the sampling clock with the incoming data signal when the former is leading and lagging behind the latter, respectively.

DESCRIPTION OF THE PREFERRED EMBODIMENTS

Figure 1:
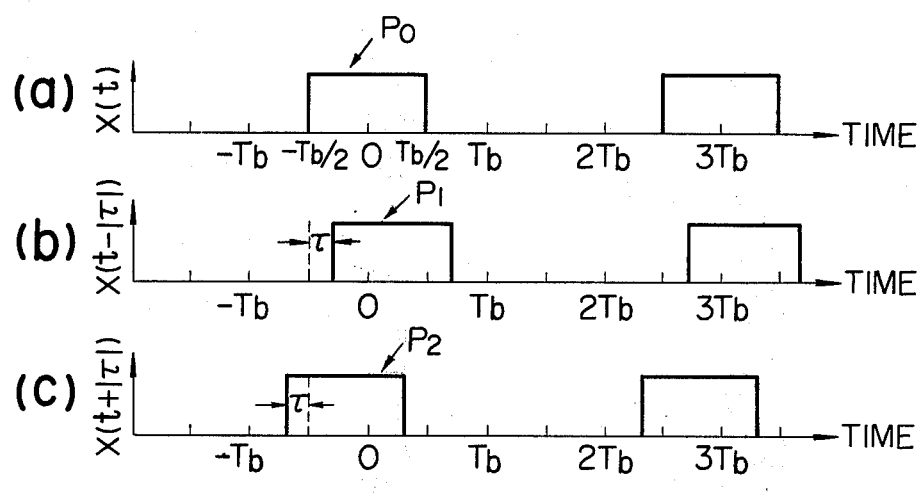
FIG. 1 is a view used for the explanation of the fundamental principle of the present invention.

Referring first to FIG. 1, the underlying principle of the present invention will be described. It is assumed the codes forming time-serial data are received at a predetermined time interval Tb and one of the codes is rectangular waveform pulse P. The lead or lag of the phase of the incoming pulses P at a sampling time point is explained as follows; A sampling time point t is defined by the following relation $t = i\,Tb$ (wherein $i = 0, \pm 1, \pm 2, \ldots$)

(See also FIG. 1). The pulse $P_0$ shown at (a) in FIG. 1 is sampled at $t=0$. That is, the center of the pulse P coincides exactly with the sampling time point. Therefore the pulse P is correctly in phase with the sampling time point. The pulse $P_1$ shown at (b) in FIG. 1 lags behind the pulse P shown at (a) by a time $\tau$. That is, the sampling time point ($t=0$) leads the center of the pulse $P_1$ by $\tau$. The pulse $P_2$ shown at FIG. 1(c) leads the pulse $P_0$ by $\tau$. That is, the sampling time point ($t=1$) lags behind the center of the pulse $P_2$ by $\tau$.

In FIG. 1(a), the function x(t) is plotted along the ordinate while the time t, along the abscissa. Then FIG. 1(b) shows the function $x(t-|\tau|)$, and FIG. 1(c), the function $x(t+|\tau|)$.

As shown in FIG. 1, not only the pulse $P_0$ which is in phase with the sampling point ($t=0$) but also the pulses $P_1$ and $P_2$ may be sampled as far as the following relation may be held:

$|\tau| \leq Tb/2$ where $\tau$ is the lead or lag in time of the center of the pulse P with respect to the sampling time point as described above. However the incoming data are inevitably subjected to distortions, noise, jitter and so on during transmission so that it is necessary to coincide the sampling time point with the center of the pulse P. In other words, the further the sampling time point leads or lags the center of the incoming pulse P, the greater the sampling errors become. Mathematically the following relationship must be always satisfied:

$|\tau| << Tb/2$

To this end, it will be required to detect whether the sampling time point t leads or lags behind the center of the incoming pulse P so as to establish a correct sampling time point. In other words, the timing information must be in phase with the center of each of the pulse codes of the incoming data.

Next the scheme for detecting whether the sampling time point leads or lags behind the center of the pulse P will be described. Each data pulse P is detected or sampled two or three times at a time interval of Tb/2, and the two or three sampled values are compared with each other so as to detect whether the sampling time point leads or lags behind the center of the sampled data pulse P. Then the two or three sampled values have one of the following three relationships:

| | | |
|---|---|---|
| (I) | $x(t0 - Tb + \tau) = x(t0 + \tau)$ | (1) |
| | or $x(t0 - Tb/2 + \tau) = x(t0 + Tb/2 + \tau)$ | (1') |
| (II) | $x(t0 - Tb + \tau) = x(t0 - Tb/2 + \tau)$ | (2) |
| | $\neq x(t0 + \tau)$ | |
| | or $x(t0 - Tb/2 + \tau) \neq x(t0 + \tau) =$ | |
| | $x(t0 + Tb/2 + \tau)$ | (2') |
| (III) | $x(t0 - Tb + \tau) \neq x(t0 - Tb/2 + \tau) =$ | |
| | $x(t0 + \tau)$ | (3) |
| | or $x(t0 - Tb/2 + \tau) - x(t0 + \tau) \neq$ | |
| | $x(t0 + Tb/2 + \tau)$ | (3') |

The relationship (I) indicates that the sampled values obtained by the successive samplings at an interval of Tb are equal. Therefore the lead or lag of the timing pulse point or $\tau$ cannot be detected. The second relationship may be interpreted as $\tau < 0$. That is, the sampling time point leads the center of the data pulse P. The third relationship (III) may be interpreted as $\tau > 0$. That is, the sampling time point lags behind the center of the data pulse P.

Therefore it follows that in order to make the phase error $\tau$ of the sampling time point zero, the sampling time point must be delayed in phase when the second relationship (II) is detected. Alternatively, the repetition frequency of the sampling pulses must be lowered. In like manner, when the third relationship (III) is detected, the sampling point time must be advanced in phase or the repetitive frequency of the sampling pulses must be increased. To this end, a sampling timing pulse oscillator may be incorporated into a phase locked loop (PLL) so as to cause the sampling pulses to follow the transmission frequency and phase of the incoming data pulses.

FIRST EMBODIMENT, FIGS. 2-5

Figure 2:
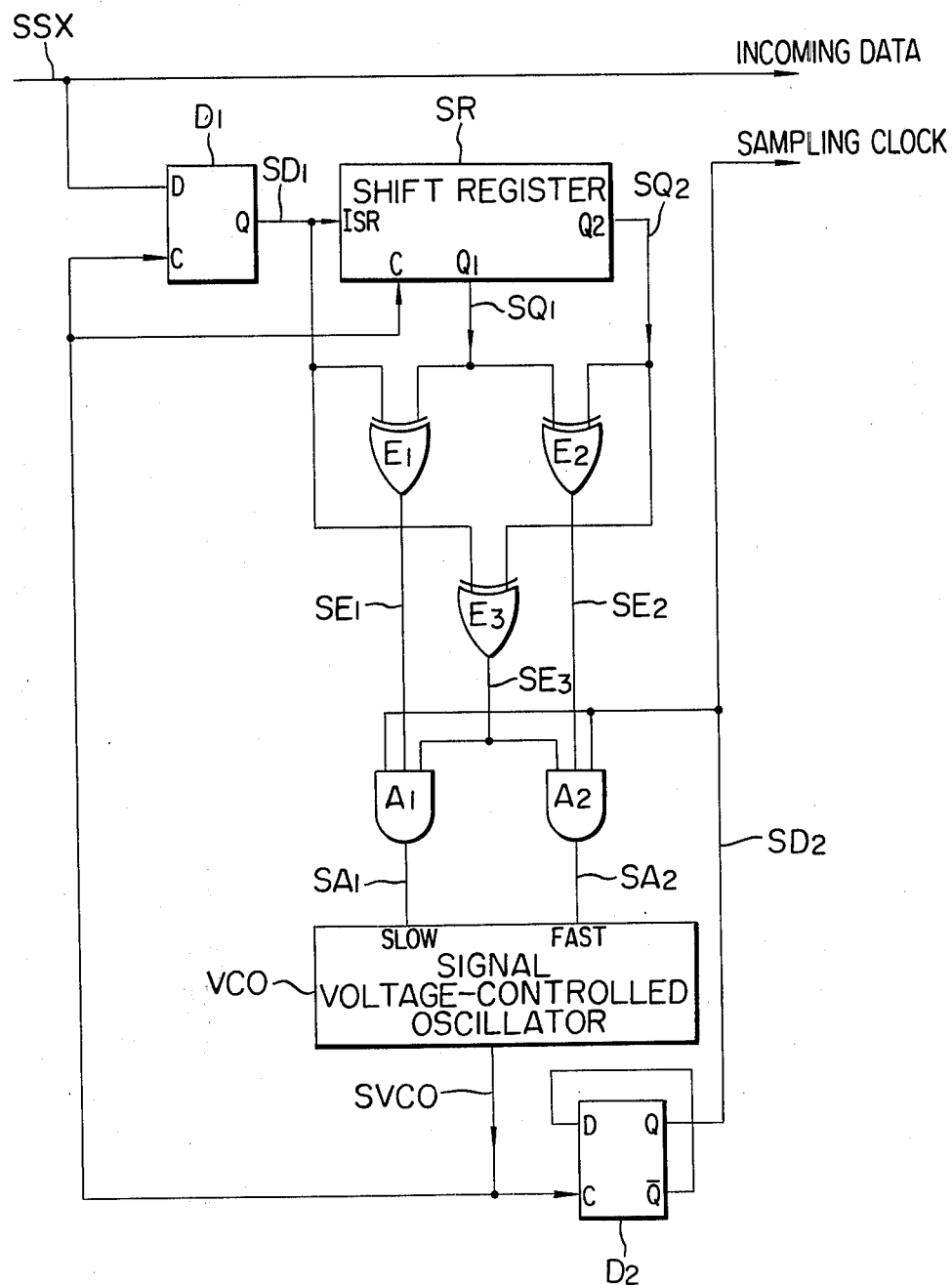
FIG. 2 is a block diagram of a first embodiment of the present invention.

In FIG. 2 is shown a block diagram of a first embodiment of the present invention. It includes first and second D flip-flops $D_1$ and $D_2$, a shift register SR, first, second and third Exclusive-Or gates $E_1$-$E_3$, first and second AND gates $A_1$ and $A_2$ and a variable phase, voltage-controlled oscillator. A wave-shaping circuit for reshaping the incoming data pulses is not shown.

Next the mode of operation of the first embodiment will be described. An incoming, binary data pulse signal SSX is applied to the terminal D of the flip-flop $D_1$ which receives at its terminal C the clock signal SVCO from the voltage-controlled oscillator VCO. In response to the positive edge of the clock pulse, the flip-flop $D_1$ is triggered so as to sample the incoming data pulse signal SSX. The output signal $SD_1$ is transmitted from the terminal Q to the input terminal ISR of the shift register SR with a capacity of two bits. In this embodiment, the flip-flop $D_1$ serves as a sample and hold circuit, thereby preventing the malfunctions of the Exclusive-Or gates $E_1$ and $E_3$. Every time when the clock pulse SVCO is applied to the input terminal C of the shift register SR, the latter is triggered in response to the positive edge of the clock pulse so as to shift the data signal $SD_1$ by one bit. The signal $SQ_1$ which appears at the output terminal $Q_1$ is therefore one bit behind the data signal $SD_1$ applied to the input terminal ISR. The output signal $SQ_2$ which appears at the output terminal $Q_2$ lags behind the input signal $SD_1$ by two bits.

Exclusive-Or gate $E_1$ detects whether or not the data signal $SD_1$ coincides with the output signal $SQ_1$ from the output terminal $Q_1$ of the shift register SR and gives the output "1" when they do not coincide with each other. In like manner, Exclusive-Or gate $E_2$ detects whether or not the output signals $SQ_1$ and $SQ_2$ from the shift register SR coincide with each other and gives the signal "1" when they do not coincide with each other. The third Exclusive-Or gate $E_3$ compares the data signal $SD_1$ at the input terminal ISR of the shift register SR with the output signal $SQ_2$ therefrom and generates the signal "1" when they do not coincide with each other.

The oscillator VCO is such that its frequency or phase may be externally controlled, and its center frequency is set to a frequency two times the Baud rate of the incoming data signal SSX. The flip-flop $D_2$ functions as a frequency divider which delivers the output whose frequency is one half ($\frac{1}{2}$) of the output frequency of the oscillator VCO. More particularly, the flip-flop $D_2$ responds to the positive edge of the output signal SVCO so as to reverse the output. The output signal $SD_2$ which appears at the output terminal Q of the flip-flop $D_2$ is used as the clock for sampling the incoming data pulse signal.

AND gate $A_1$ receives the output $E_3$ from the first Exclusive-Or gate $E_1$, the output $SE_3$ from the third Exclusive-Or gate $E_3$ and the output $SD_2$ from the second flip-flop $D_2$. When all the inputs to the AND gate $A_1$ are "1"s, the gate $A_1$ gives the output $SA_1$ to the input terminal SLOW of the oscillator VCO so that the output signal SVCO of the oscillator VCO may be delayed in phase or decreased in frequency. AND gate $A_2$ receives the output $SE_2$ from the second Exclusive-Or gate $E_2$, the output $SE_3$ from the third Exclusive-Or gate $E_3$ and the output $SD_2$ from the second flip-flop $D_2$. When all the inputs are "1"s, the gate $A_2$ gives the output signal $SA_2$ to the input terminal FAST of the oscillator VCO so that the output signal SVCO from the oscillator VCO may be advanced in phase or increased in frequency.

The output signal $SD_2$ from the second flip-flop $D_2$ are applied to both the AND gates $A_1$ and $A_2$ because of the reasons to be described below. As described above, the first, second and third Exclusive-Or gates $E_1$, $E_2$ and $E_3$ compare the input signal $SD_1$ to the shift register SR with its output $SQ_1$, the output $SQ_1$ with the output $SQ_2$ and the input signal $SD_1$ with the output signal $SQ_2$, respectively. These comparison operations are executed at a time interval of $Tb/2$; that is, at a frequency a half of the pulse duration of the incoming data pulses (See FIG. 1). When each comparison operation is executed at the timing of 1.5Tb, 2.5Tb and so on of the input data signal $SD_1$ at the input terminal ISR of the shift register SR; that is, when the sampling time point coincides with the ends of the incoming data pulse P, the results of the comparison operations may be neglected. However each comparison operation is executed at the timing of 0Tb, 1Tb, 2Tb and so on; that is, when the data pulse at a reference time point is sampled, the output signal $SD_2$ from the second flip-flop $D_2$ enables AND gate $A_1$ or $A_2$ so that the comparison result may be applied to the oscillator VCO.

When the incoming, time serial data pulses are sampled in response to the positive edges of the clock signal $SD_2$ from the second flip-flop $D_2$, the sampling errors may be minimized. When the output signal $SD_2$ from the second flip-flop $D_2$ is at a high level or "1", the effective incoming data (that is, the data sampled at the reference time points such as 0Tb, 1Tb and so on) appear at both the input terminal ISR and the output terminal $Q_2$ of the shift register SR. On the other hand, when the clock signal $SD_2$ is at a low level or "0", no effective incoming data are obtained from the terminals ISR and $Q_2$ while the effective incoming data appears at the terminal $Q_1$ of the shift register SR. This will be explained mathematically as follows:

(I) When the clock signal $SD_2$ is "1", $x(t0+\tau)$ appears at the input terminal ISR; $x(t0-Tb/2+\tau)$ appears at the output terminal $Q_1$; and $x(t0-Tb+\tau)$, at the output terminal $Q_2$.

(II) When the clock signal $SD_2$ is "0", $x(t0-Tb/2+\tau)$ is present at the input terminal IRS; $x(t0-Tb+\tau)$ appears at the output terminal $Q_1$; and $x(t0-3Tb/2+\tau)$ appears at the second output terminal $Q_2$.

As described above, it is only when the clock signal $SD_2$ is "1" when the logic circuit of the type shown in FIG. 2 can detect whether or not the sampling pulse is in phase with the incoming data pulse. More particularly, assume that both the clock signal $SD_2$ and the output signal $SE_3$ from the third Exclusive-Or gate $E_3$ are "1"s; that is, there exist the effective incoming data at both the input terminal ISR and the second output terminal $Q_2$ of the shift register SR and are different in logic level from each other. Then (a) when the incoming data signal $SD_1$ and the output signal $SQ_1$ at the first terminal $Q_1$ are different in logic level from each other, the output signal $SE_1$ from the first Exclusive-Or gate $E_1$ is "1" and consequently the output signal $SA_1$ from the first AND gate $A_1$ is "1". This means that the clock signal $SD_2$ or the sampling pulse leads the incoming data signal SSX. Therefore the output SAL (="1") from the first AND gate $A_1$ is impressed at the SLOW terminal of the oscillator VCO so that the oscillation phase is delayed or the oscillation frequency is decreased, thereby making the absolute value of the sampling phase error $\tau$ zero. (b) When the output signal $SQ_1$ at the output terminal $Q_1$ is different in logic level from the output signal $SQ_2$ at the second output terminal $Q_2$ of the shift register SR, the output signal $SE_2$ from the second Exclusive-Or gate $E_2$ becomes "1" and consequently the output signal $SE_2$ from second AND gate $A_2$ becomes also "1". This means that the clock signal $SD_2$ or the sampling pulse lags behind the incoming data pulse SSE. Therefore the output signal $SA_2$ (="1") is applied to the FAST terminal of the oscillator VCO so that the oscillation phase may be advanced or the oscillation frequency may be increased, thereby making the sampling phase error $\tau$ zero.

From the foregoing explanation it is apparent that the output $SA_1$ from the first AND gate $A_1$ and the output signal $SA_2$ from the second AND gate $A_2$ cannot be "1" simultaneously If both the outputs $SE_1$ and $SE_2$ from the first and second Exclusive-Or gates $E_1$ and $E_2$ were "1"s at the same time, the output signal $SE_3$ from the third Exclusive-Or gate $E_3$ would be "0" because the signals $SD_1$, $SQ_1$ and $SQ_2$ are all binary logic signals.

Figure 3:
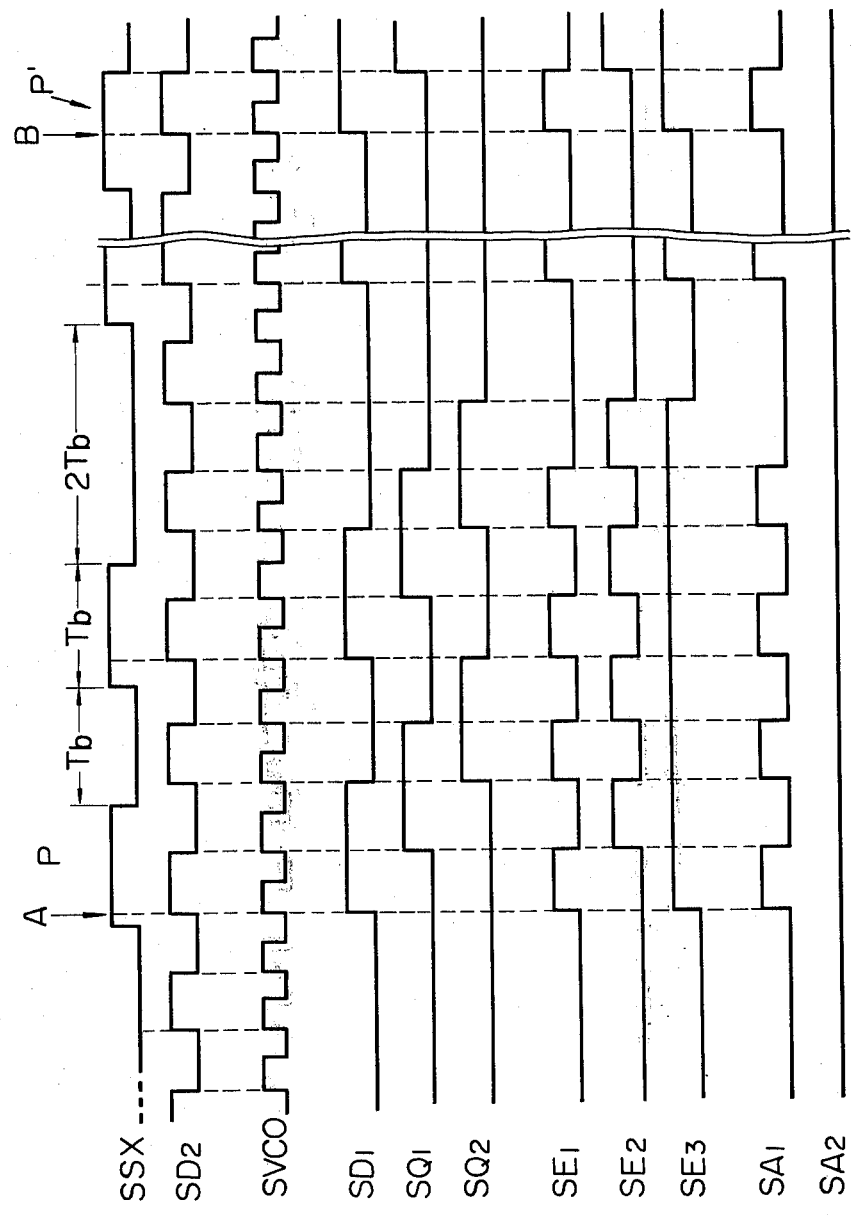
FIGS. 3 and 4 are timing charts used for the explanation of the mode of operation of the first embodiment shown in FIG. 2 for forcing the sampling clock to synchronize in phase with the incoming data signal when the former is leading and lagging behind the latter, respectively.

In FIG. 3 is shown the timing chart of the signals of the first embodiment described above with reference to FIG. 2. It shows the process for progressively delaying the phase of the sampling pulse which is initially shown as leading the incoming data pulse so as to synchronize the leading or positive edge of the sampling clock pulse $SD_2$ with the center B of the data pulse P'. More particularly, as indicated by the arrow A, the sampling time point or the positive edge of the sampling clock pulse $SD_2$ initially leads the center of the data pulse P (the incoming data SSX) considerably. However as described above the output signal $SA_1$ from first AND gate $A_1$ is repeatedly applied to the SLOW terminal of the oscillator VCO so that the sampling time point is progressively delayed. Finally the positive edge of the sampling clock pulse $SD_2$ is made to synchronize correctly with the center of the data pulse P' as indicated by the arrow.

Figure 4:
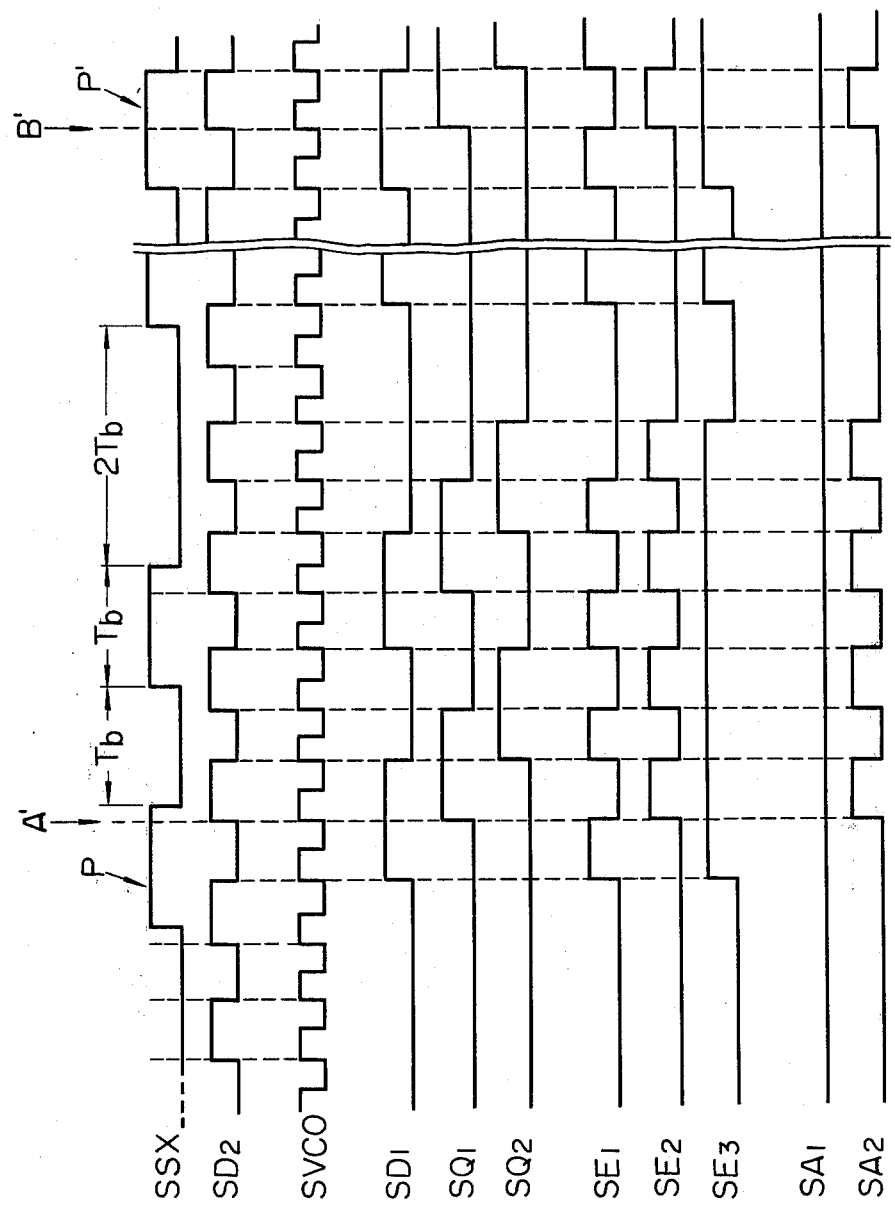

In FIG. 4 is shown the timing chart illustrating the process for progressively advancing the phase of the sampling clock pulse $SD_2$ which is initially shown as lagging behind the data pulse P so as to correctly synchronize the sampling clock pulse $SD_2$ with the center of the data pulse SSX. More particularly, initially the sampling time point or the positive edge of the sampling clock pulse $SD_2$ lags behind the center of the data pulse P as indicated by the arrow A', but the output signal $SA_2$ from second AND gate $A_2$ is repeatedly applied to the FAST terminal of the oscillator VCO so that the sampling time point or the positive edge of the sampling clock pulse $SD_2$ is progressively advanced and finally correctly synchronized with the center of the data pulse P' as indicated by the arrow B'.

Figure 5:
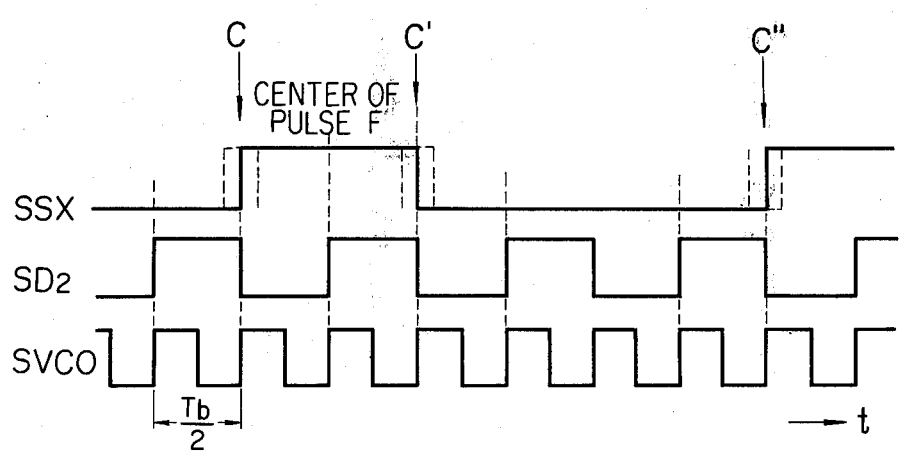
FIG. 5 shows a timing chart used for the explanation of some countermeasures against malfunctions of a timing data reproduction system which arises even when the sampling clock is in perfect synchronization with the incoming data signal.

In FIG. 5 is shown the timing chart when the sampling clock pulse $SD_2$ is initially in phase with the data pulse SSX; that is, there exists no sampling phase error. Since the positive edge of the sampling clock pulse $SD_2$ correctly coincides with the center of the data pulse P (SSX) as indicated by the dotted-line arrow, the sampling clock pulse $SD_2$ is correctly in phase with the data pulse. At the positive edges C and C" and at the negative edge C' the transition of the data pulse SSX occurs. Since the logic circuit shown in FIG. 2 operates on the binary-state signal or two-valued signal, the sampled value at the point C, C' or C" must be "0" or "1". In general, the incoming data signal SSX is subjected to waveform distortions and jitter occurs during transmission so that the transition point C, C' or C" or the leading or trailing edge of the data pulse SSX is caused to be displaced or fluctuated in the range indicated by the dotted lines in FIG. 5. (This phenomenon will be referred to as "jitter" simply in this specification.) Because of jitter, even when the sampling clock pulse $SD_2$ is in correct phase relationship with the incoming data pulse SSX; that is, even when there is no sampling phase difference, the sampling clock pulse $SD_2$ may be detected as being out of phase with the data pulse SSX at the transition point C, C' or C". As a result, the sampling clock pulse $SD_2$ is adversely affected, causing jitter. However, these adverse effects may be satisfactorily minimized by setting the loop gain of the phase-locked loop to a suitable small value or by providing suitable loop filter means. These and other countermeasures are well known to those skilled in the art, so that no further description shall be made in this specification.

From the timing charts shown in FIGS. 3 and 4, it might have been noticed that the output signal $SE_3$ from the third Exclusive-Or gate $E_3$ plays no role in the first embodiment shown in FIG. 2. That is, when the reliability of the first embodiment shown in FIG. 2 is so high that the normal operations may be ensured at any time, the third Exclusive-Or gate $E_3$ may be eliminated. In the normal operations, if the logic circuit shown in FIG. 2 would not experience any adverse external effects such as noise, the output signal $SQ_1$ from the first output terminal $Q_1$ of the shift register SR would be equal in logic level to the input signal $SD_1$ and the output signal $SQ_2$ from the second output terminal $Q_2$ of the shift register SR when the sampling clock pulse $SD_2$ is "1" (so that the effective data pulses exist both at the input and second output terminals ISR and $Q_2$ of the shift register SR) and moreover when the input signal $SD_1$ and the second output signal $SQ_2$ of the shift register SR coincide with each other. However because of noise or the like, the first output signal $SQ_1$ will not coincide with the input signal $SD_1$ (and the second output signal $SQ_2$) in some cases. The third Exclusive-Or gate $E_3$ is incorporated in the logic circuit shown in FIG. 2 in order to avoid such malfunctions as described above due to the external and internal noise. That is, no output signal $SE_3$ can be derived from the third Exclusive-Or gate $E_3$ when the input and second output signals $SD_1$ and $SQ_2$ are equal in logic level even when the first output signal $SQ_1$ from the first output terminal $Q_1$ of the shift register SR does not coincide with the input and second output signals $SD_1$ and $SQ_2$. As a consequence neither first AND gate $A_1$ or second AND gate $A_2$ is disabled, so that malfunctions may be avoided. The foregoing explanation may suffice to make those skilled in the art understood the function of the third Exclusive-Or gate $E_3$.

SECOND EMBODIMENT, FIG. 6

Figure 6:
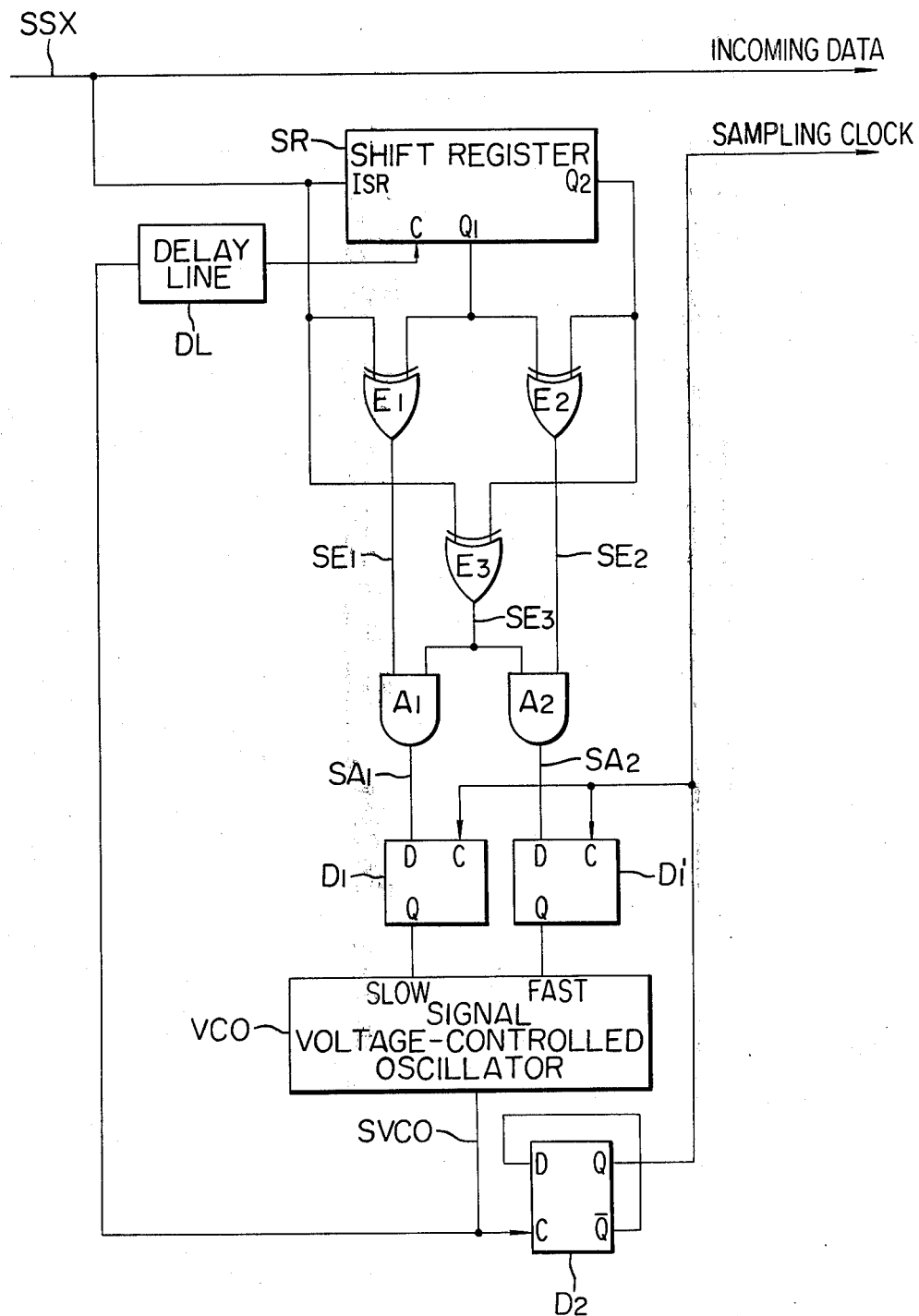
FIG. 6 is a block diagram of a second embodiment of the present invention.

A second embodiment of the present invention shown in FIG. 6 is substantially similar in construction to the first embodiment shown in FIG. 2 except that instead of the first flip-flop $D_1$ which serves as a sample and hold circuit, flip-flops $D_1$ and $D_{1'}$, are interconnected between first AND gate $A_1$ and the SLOW terminal of the oscillator VCO and between second AND gate $A_2$ and the FAST terminal of the oscillator VCO. These flip-flops $D_1$ and $D_{1'}$ serve also as a sample and hold circuit and are substantially similar in construction. The second embodiment is further differentiated from the first embodiment in that the terminal C of the flip-flop $D_2$ is connected through a delay line DL to the clock input terminal C of the shift register SR. A time delay Td attained by the time-delay circuit DL is so selected as to satisfy the following relationship:

$$0 < Td < < Tb$$

The function of the time-delay circuit DL is to prevent a shift in the shift register SR immediately before the signal is set in the flip-flop $D_1$ or $D_{1'}$ in response to the positive edge of the output signal $SD_2$ from the flip-flop $D_2$. In the second embodiment the sum of the time-delay provided by the Exclusive-Or gates $E_1$, $E_2$ and $E_3$, AND gates $A_1$ and $A_2$ and the time-delay circuit DL must be greater than the operating time of the D-type flip-flops $D_1$, $D_{1'}$ and $D_2$.

Referring back to FIG. 2, the output signals $SA_1$ and $SA_2$ of first and second AND gates $A_1$ and $A_2$ may be expressed in logical symbolic form as follows:

$$SA_1 = SD_2 \wedge (SD_1 \oplus SQ_2) \wedge (SD_1 \oplus SQ_1) \qquad (4)$$

$$SA_2 = SD_2 \wedge (SD_1 \oplus SQ_2) \wedge (SQ_1 \oplus SQ_2) \qquad (5)$$

where $\wedge$ = logic AND, and $\oplus$ = Exclusive-Or.

Eqs. (4) and (5) may be rewritten as follows:

$$SA_1 = SD_2 \wedge [(SD_1 \wedge \overline{SQ_1} \wedge \overline{SQ_2}) \vee (\overline{SD_1} \wedge SQ_1 \wedge SQ_2)] \qquad (4')$$

$$SA_2 = SD_2 \wedge [(SD_1 \wedge SQ_1 \wedge \overline{SQ_2}) \vee (\overline{SD_1} \wedge \overline{SQ_1} \wedge SQ_2)] \qquad (5')$$

where V = logic OR and $\overline{SQ_1}$ = logic NOT of the statement $SQ_1$.

A logic circuit implementing these equations (4') and (5') is structurally different from the logic circuit shown in FIG. 2 but may accomplish the same functions.

THIRD EMBODIMENT, FIG. 7

Figure 7:
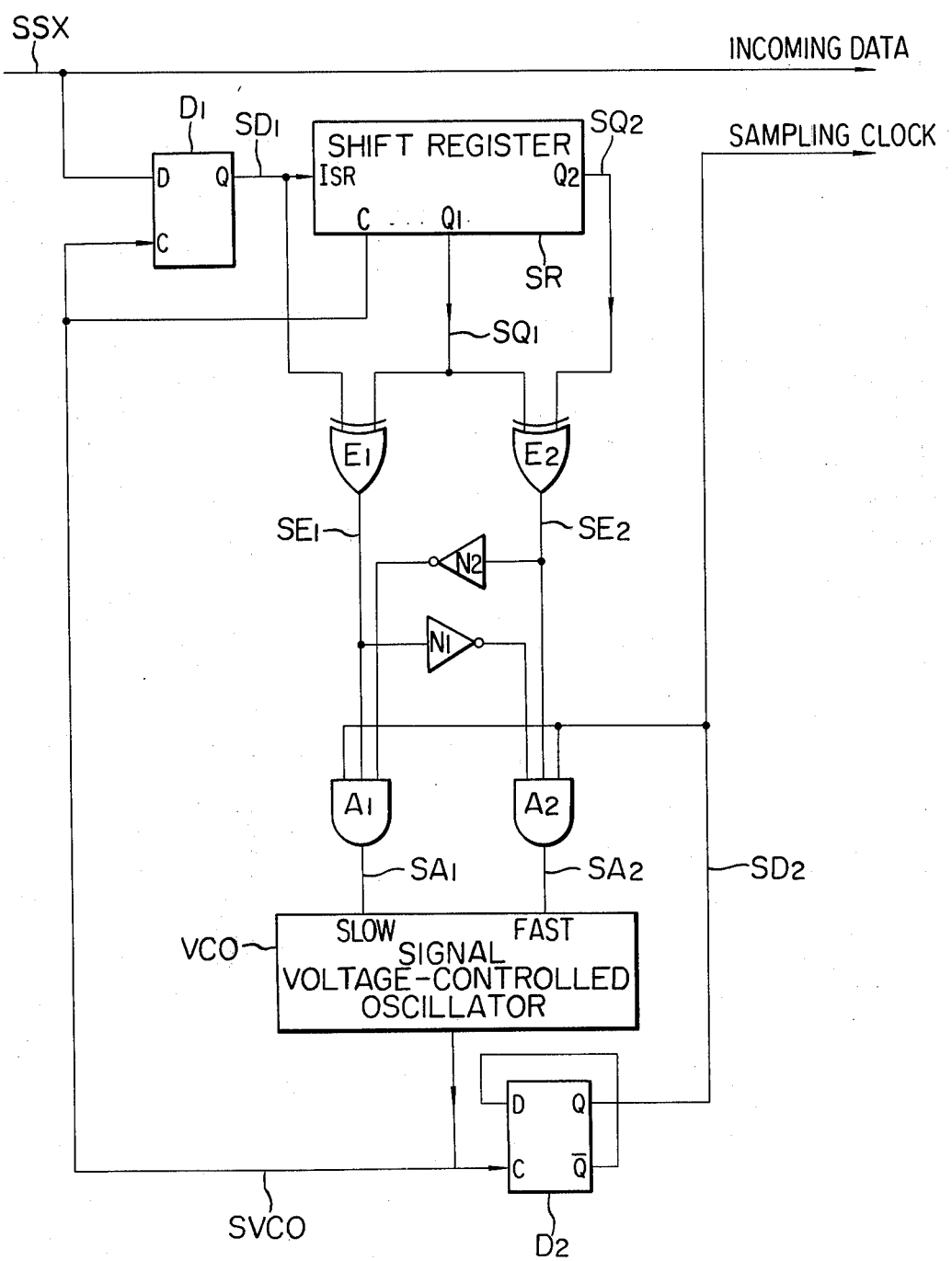
FIG. 7 is a block diagram of a third embodiment of the present invention.

A third embodiment shown in FIG. 7 is subsantially similar in construction to the first embodiment shown in FIG. 2 except that the third Exclusive-Or circuit $E_3$ is eliminated and that a first inverter $N_1$ is interconnected between the first Exclusive-Or gate $E_1$ and the second AND gate $A_2$ while a second inverter $N_2$ is interconnected between the second Exclusive-Or gate $E_2$ and the first AND gate $A_1$. These first and second inverters $N_1$ and $N_2$ may inhibit that the output signals $SE_1$ and $SE_2$ from the first and second Exclusive-Or gates $E_1$ and $E_2$ becomes "1" simultaneously. The mode of operation of the third embodiment may be apparent to those skilled in the art when reference is made to FIGS. 3 and 4.

As described elsewhere, the Exclusive-Or gates $E_3$ shown in the first embodiment (See FIG. 2) may be eliminated when the incoming data pulse SSX is not so adversely affected by noise and not so adversely distorted in shape during transmission that no malfunction of the logic circuit will result. The elimination of the third Exclusive-Or gate $E_3$ may be also possible by such an arrangement that the inputs to the SLOW and FAST terminals of the oscillator VCO may cancel each other if the output signals $SA_1$ and $SA_2$ from first and second AND gates $A_1$ and $A_2$ should be "1" simultaneously as will be described below.

FOURTH EMBODIMENT, FIG. 8

Figure 8:
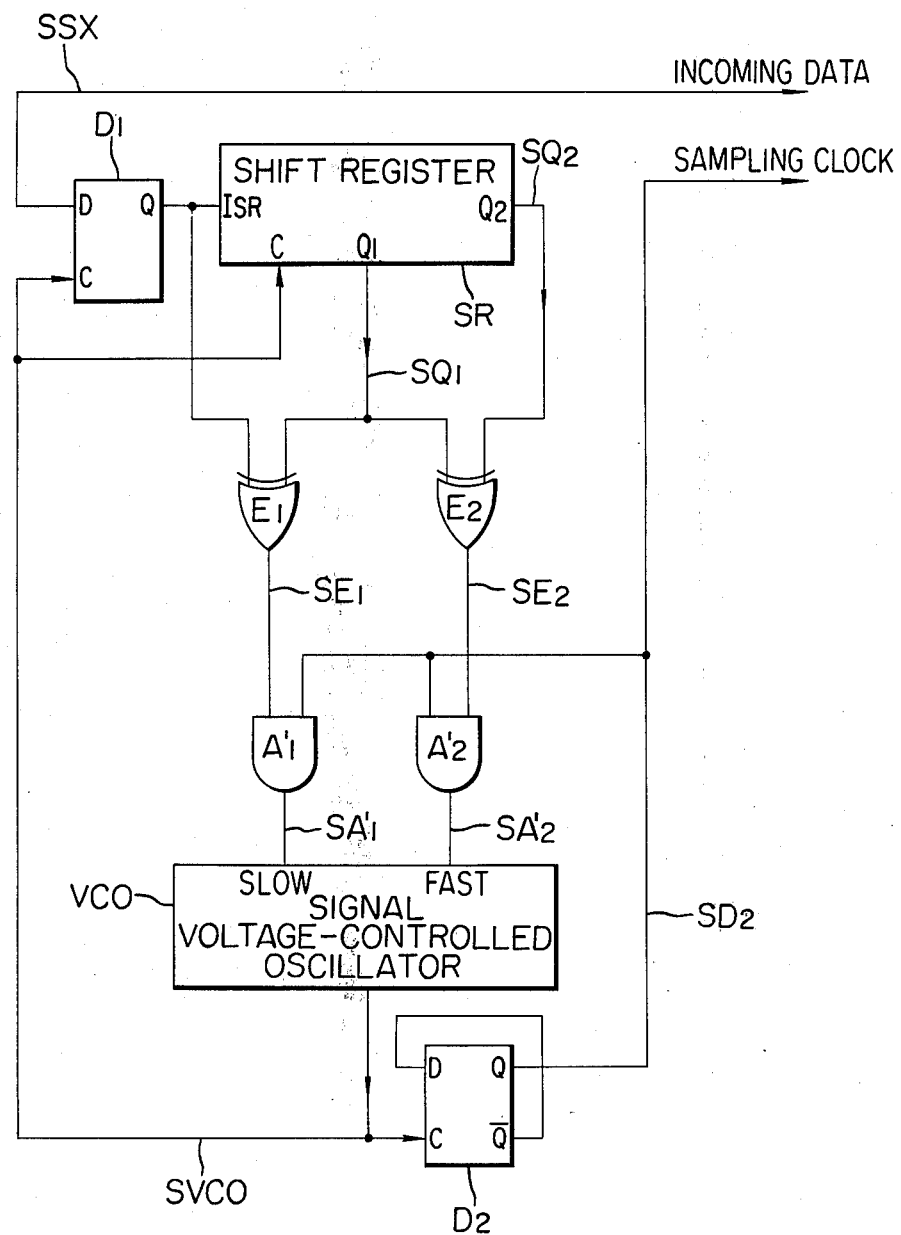
FIG. 8 is a block diagram of a fourth embodiment of the present invention.

A fourth embodiment of the present invention implementing the foregoing logical operations is shown in FIG. 8. The mode of the fourth embodiment is apparent to those skilled in the art when reference is made to the timing charts shown in FIGS. 3 and 4.

In the fourth embodiment, the output signals $SA_{1'}$ and $SA_{2'}$ from the first and second AND gates $A_{1'}$ and $A_{2'}$ may be expressed in the following logical symbolic form:

$$SA_{1'} = SD_2 \wedge (SD_1 \oplus SQ_1)$$
$$= SD_2 \wedge [(SD_1 \wedge \overline{SQ_1}) \vee (\overline{SD_1} \wedge SQ_1)] \quad (6)$$
$$SA_{2'} = SD_2 \wedge (SQ_1 \oplus SQ_2)$$
$$= SD_2 \wedge [(SQ_1 \wedge \overline{SQ_2}) \vee (\overline{SQ_1} \wedge SQ_2)] \quad (7)$$

FIFTH EMBODIMENT, FIGS. 9, 10 AND 11

Figure 9:
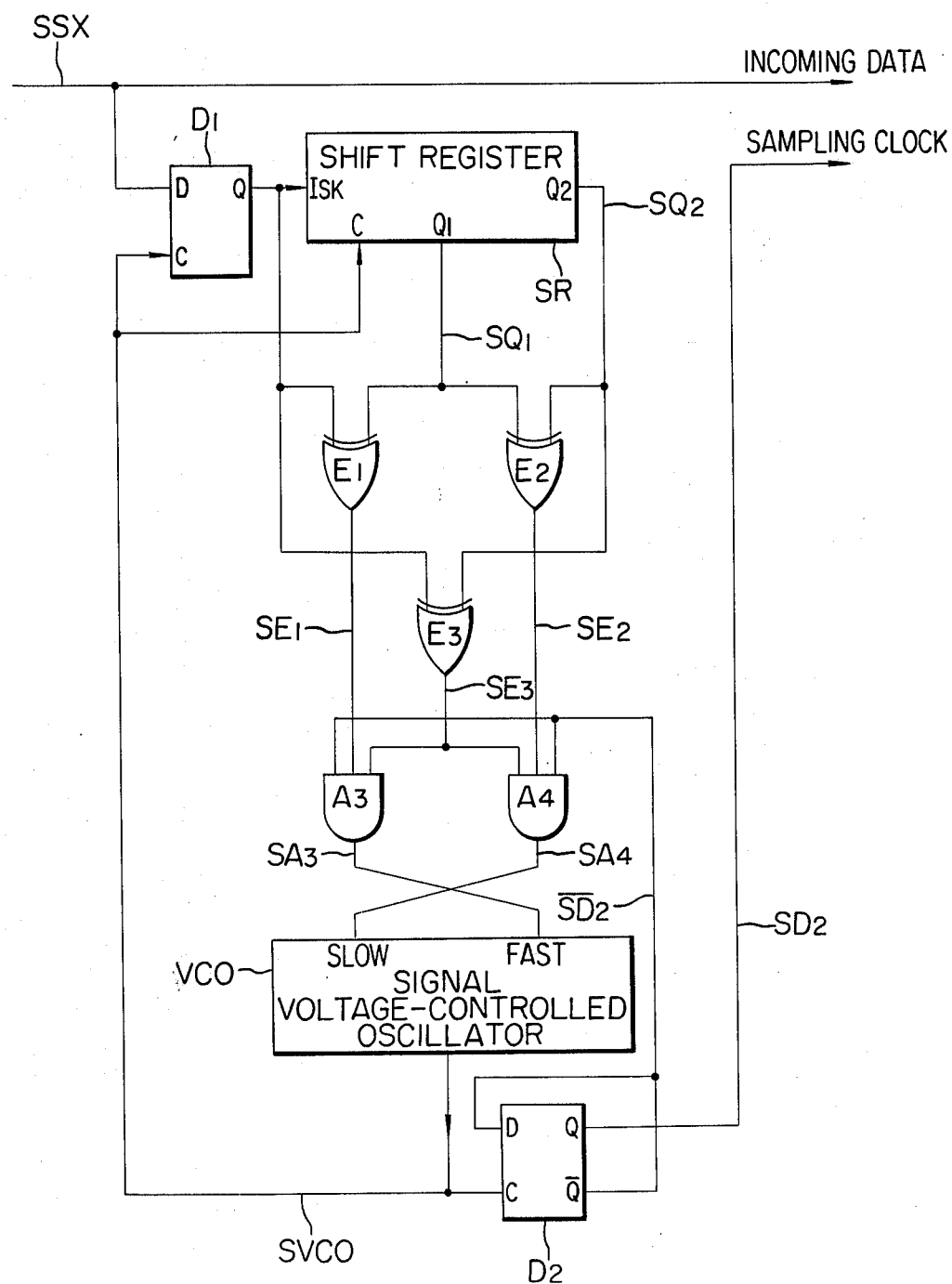
FIG. 9 is a block diagram of a fifth embodiment of the present invention.

A fifth embodiment of the present invention shown in FIG. 9 may implement the fundamental equations (1'), (2') and (3') described elsewhere in conjunction with the underlying principle of the present invention.

The output signals $SA_3$ and $SA_4$ from first and second AND gates $A_3$ and $A_4$ may be expressed in logical symbolic form as follows:

$$SA_3 = \overline{SD_2} \wedge (SD_1 \oplus SQ_2) \wedge (SD_1 \oplus SQ_1)$$
$$= \overline{SD_2} \wedge [(SD_1 \wedge \overline{SQ_1} \wedge \overline{SQ_2}) \vee (\overline{SD_1} \wedge SQ_1 \wedge SQ_2)] \quad (8)$$
$$SA_4 = \overline{SD_2} \wedge (SD_1 \oplus SQ_2) \wedge (SQ_1 \oplus SQ_2)$$
$$= \overline{SD_2} \wedge [(SD_1 \wedge SQ_1 \wedge \overline{SQ_2}) \vee (\overline{SD_1} \wedge \overline{SQ_1} \wedge SQ_2)] \quad (9)$$

The logic "1" output signal $SA_3$ from the first AND gate $A_3$ is applied to the FAST terminal of the oscillator VCO so that the oscillation phase may be advanced or the oscillation frequency may be increased. The logic "1" output signal $SA_4$ from the second AND gate is applied to the SLOW terminal of the oscillator VCO so that the oscillation phase may be delayed or the oscillation frequency may be decreased.

Figure 10:
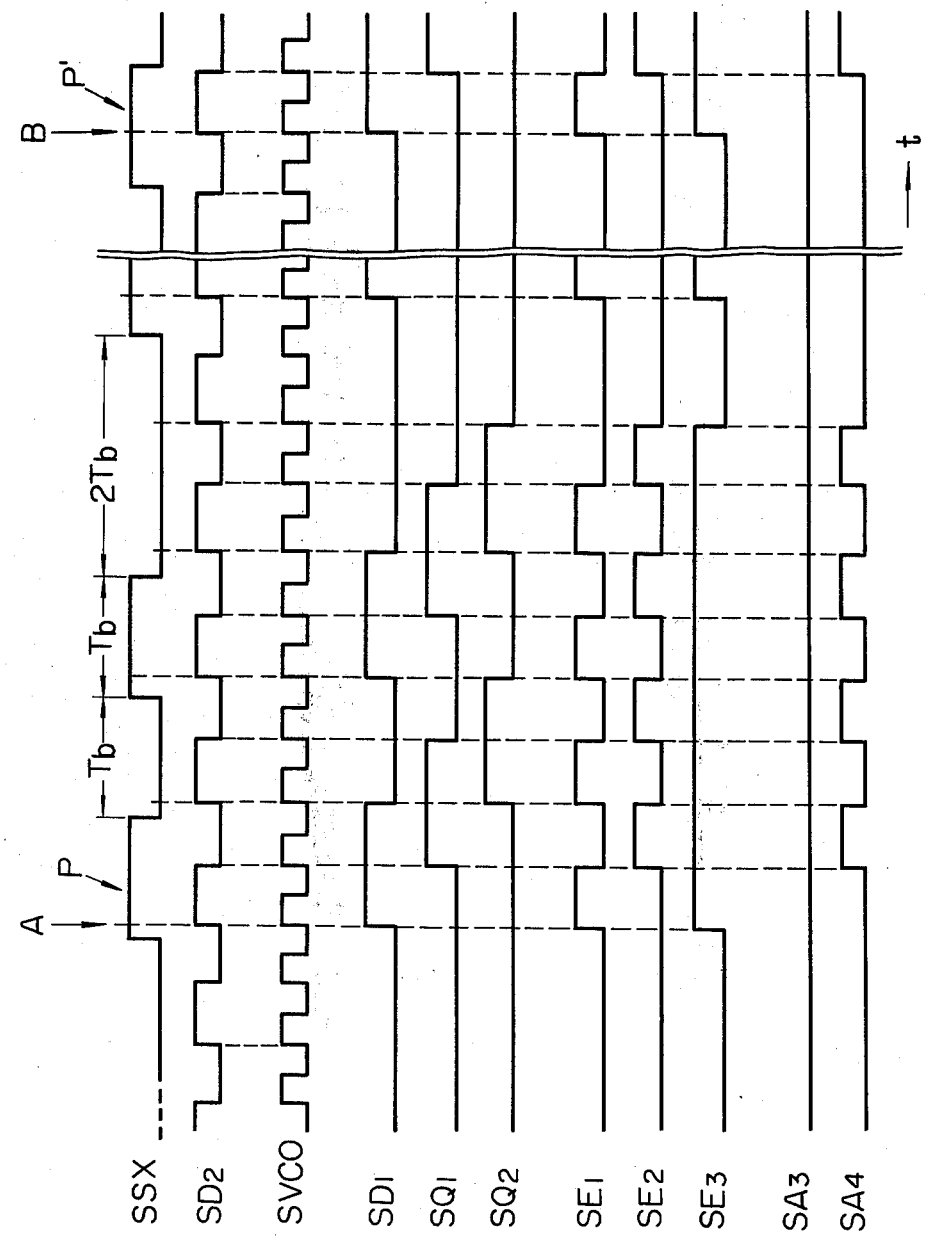
FIGS. 10 and 11 show timing charts used for the explanation of the mode of operation of the fifth embodiment for synchronizing the sampling clock with the incoming data signal when the former is leading and lagging behind the latter.

The mode of operation of the fifth embodiment will be described first with reference to FIG. 10. FIG. 10 shows the time chart of the process for progressively delaying the sampling time point, which is shown as leading the center of the data pulse P (SSX) as indicated by the arrow A, so as to correctly synchronize the sampling time point or the positive edge of the sampling clock pulse $SD_2$ with the center of the data pulse $P'$ as indicated by the arrow B. That is, as with the case of the first embodiment the output signal $SA_4$ is repeatedly applied to the SLOW terminal of the oscillator VCO so that the oscillation phase may be progressively delayed or the oscillation frequency may be progressively decreased.

Figure 11:
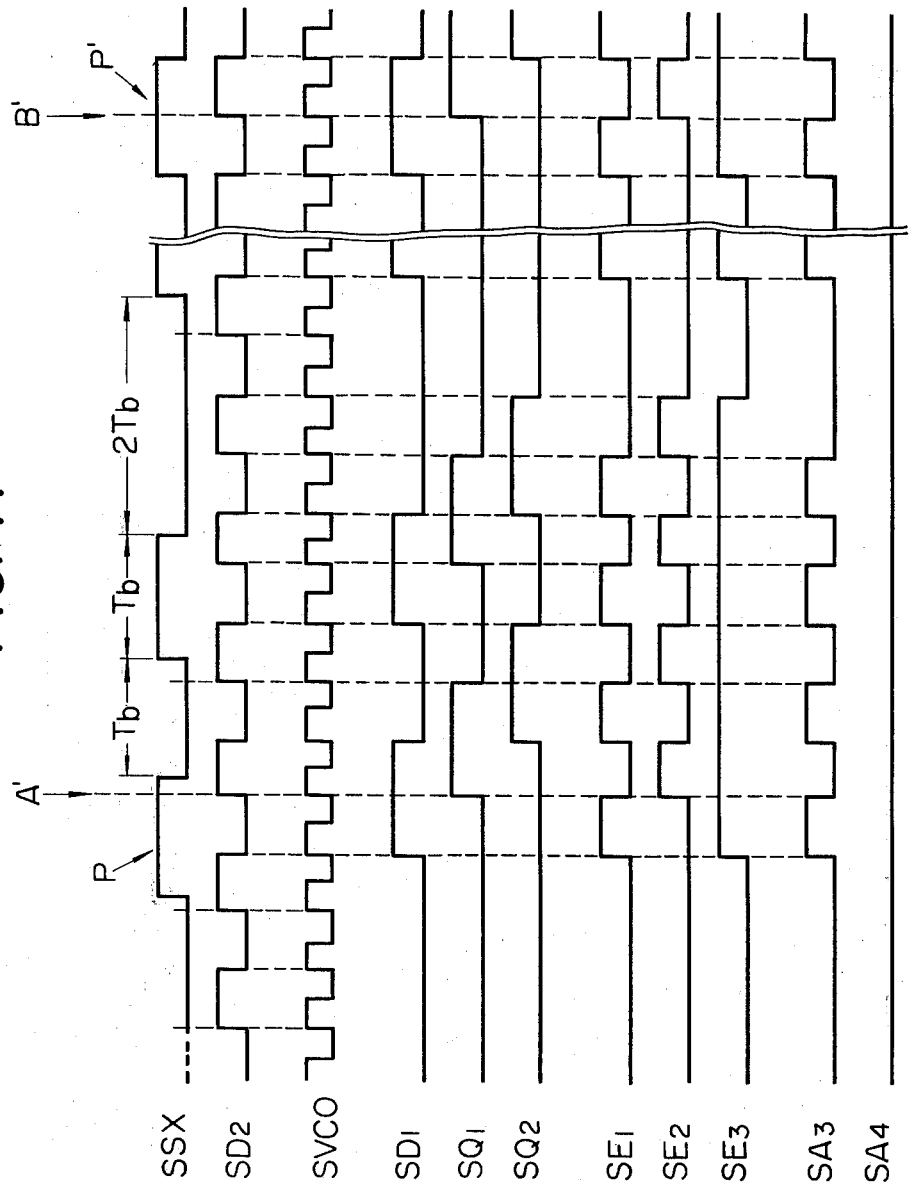

The process for synchronizing the sampling clock pulse $SD_2$ with the data pulse SSX (p) when the clock pulse $SD_2$ is initially detected as lagging behind the center of the data pulse p as indicated by the arrow $A'$ may be understood with reference to FIG. 11. That is, the output signal $SA_3$ is repeatedly applied from first AND gate $A_3$ to the FAST terminal of the oscillator VCO so that the phase of the sampling clock pulse $SD_2$ may be progressively advanced so as to correctly synchronize the positive edge of the sampling clock pulse $SD_2$ with the center of the data pulse $P'$ as indicated by the arrow $B'$.

SIXTH EMBODIMENT, FIG. 12

Figure 12:
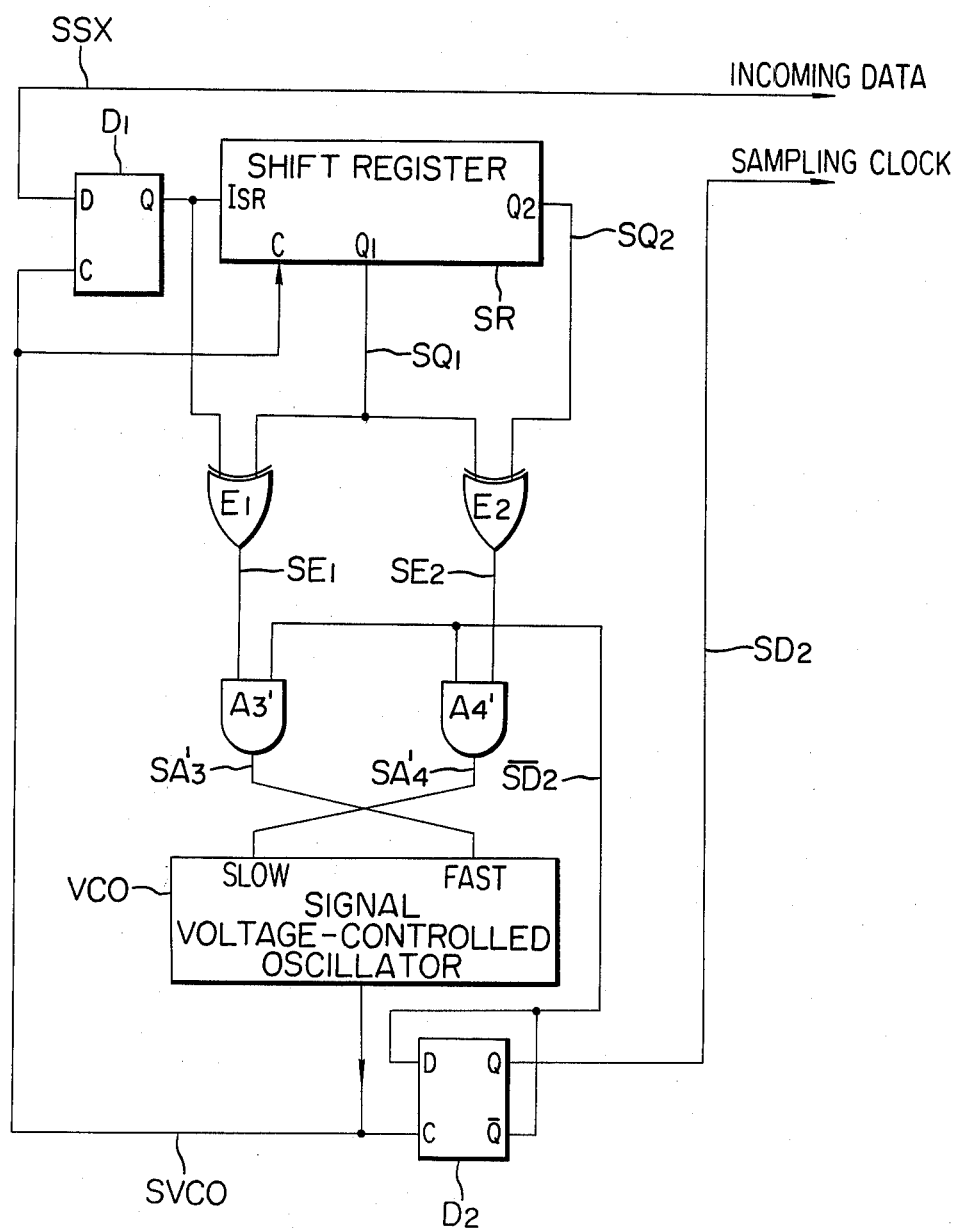
FIG. 12 is a block diagram of a sixth embodiment of the present invention.

A sixth embodiment of the present invention shown in FIG. 12 is substantially similar in construction to the fifth embodiment shown in FIG. 9 except that the third Exclusive-Or gate $E_3$ is eliminated because of the reason described elsewhere referring to the fourth embodiment shown in FIG. 8. The mode of operation will be apparent from the time charts shown in FIGS. 10 and 11.

In the sixth embodiment, the output signals $SA_{3'}$ and $SA_{4'}$ from the first and second AND gates $A_{3'}$ and $A_{4'}$ may be expressed in logical symbolic form as follows:

$$SA_{3'} = \overline{SD_2} \wedge (SD_1 \oplus SQ_1)$$
$$= \overline{SD_2} \wedge [(SD_1 \wedge \overline{SQ_1}) \vee (\overline{SD_1} \wedge SQ_1)] \quad (10)$$
$$SA_{4'} = \overline{SD_2} \wedge (SQ_1 \oplus SQ_2)$$
$$= \overline{SD_2} \wedge [(SQ_1 \wedge \overline{SQ_2}) \vee (\overline{SQ_1} \wedge SQ_2)] \quad (11)$$

SEVENTH EMBODIMENT, FIG. 13

Figure 13:
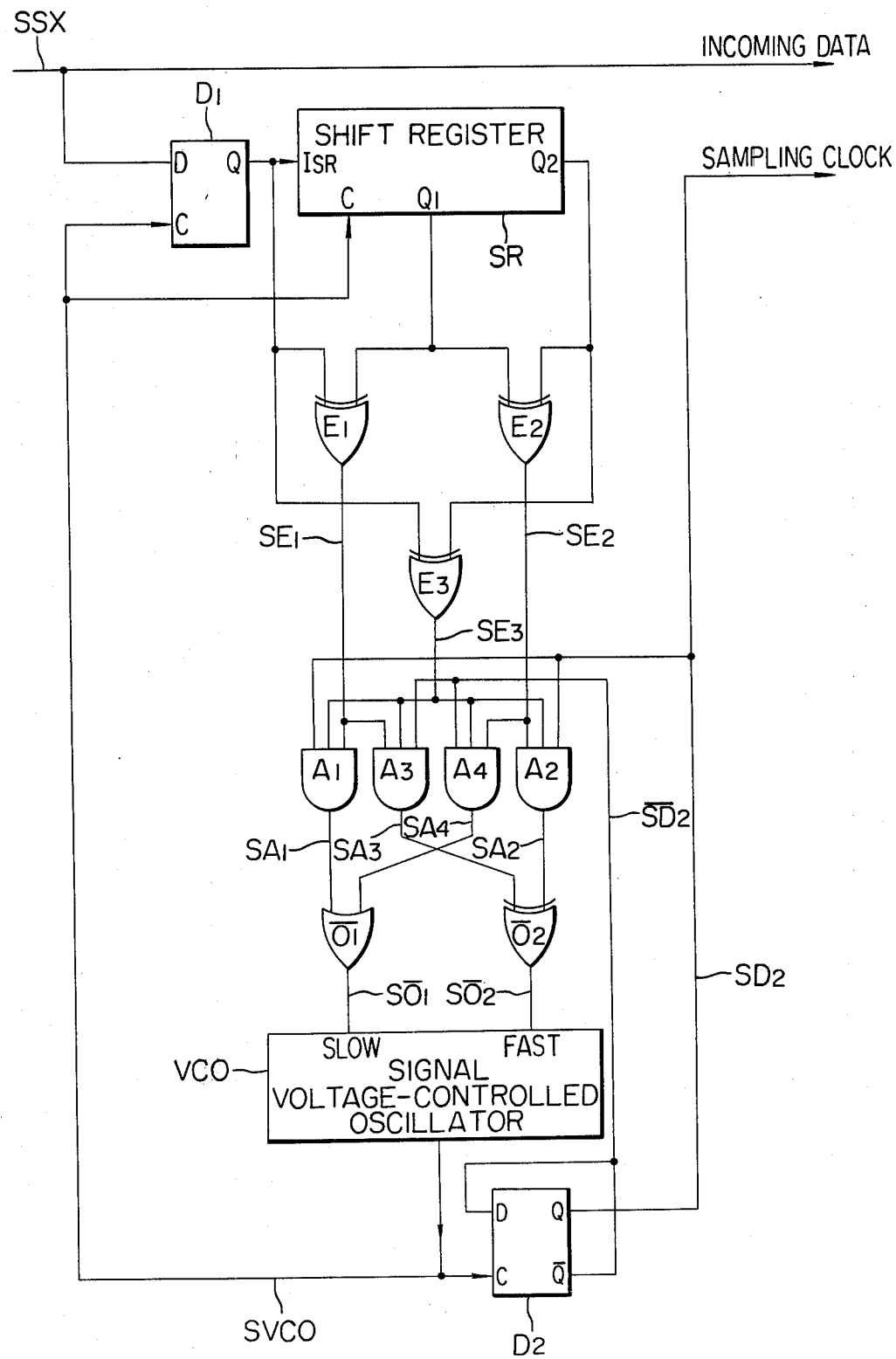
FIG. 13 is a block diagram of a seventh embodiment of the present invention.

A seventh embodiment of the present invention shown in FIG. 13 may implement the fundamental equations (1), (2), (3), (1'), (2') and (3') and is therefore a combination of the first embodiment shown in FIG. 2 and the fifth embodiment shown in FIG. 9.

More particularly, the output signals $SA_1$ and $SA_4$ from the first and fourth AND gates $A_1$ and $A_4$ are applied to a first OR gate $O_1$, and the output $SO_1$ from the first OR gate $O_1$ is applied to the SLOW terminal of the oscillator VCO. The output signals $A_2$ and $A_3$ from the second and third AND gates $A_1$ and $A_3$ are applied to a second OR gate $O_2$, and the output signal $SO_2$ from the second OR gate $O_2$ is applied to the FAST terminal of the oscillator VCO.

The output signals $SO_1$ and $SO_2$ may be expressed in logical symbolic form as follows:

$$SO_1 = SA_1 \vee SA_4 = [SD_2 \wedge (SD_1 \oplus SQ_2) \wedge (SD_1 \oplus SQ_1)] \vee [\overline{SD_2} \wedge (SD_1 \oplus SQ_2) \wedge (SQ_1 \oplus SQ_2)] = (SD_1 \oplus SQ_2) \wedge [\{\overline{SD_2} \wedge (SD_1 \oplus SQ_1)\} \vee \{\overline{SD_2} \wedge (SD_1 \oplus SQ_2)\}] \quad (12)$$

$$SO_2 = SA_2 \vee SA_3 = \{SD_2 \wedge (SD_1 \oplus SQ_2) \wedge (SQ_1 \oplus SQ_2)\} \vee \{\overline{SD_2} \wedge (SD_1 \oplus SQ_2) \wedge (SQ_1 \oplus SQ_1)\} = (SD_1 \oplus S-Q_2) \wedge [\{SD_2 \wedge (SQ_1 \oplus SQ_2)\} \vee \{SD_2 \wedge (SD_1 \oplus SQ_1)\}] \quad (13)$$

Figure 14:
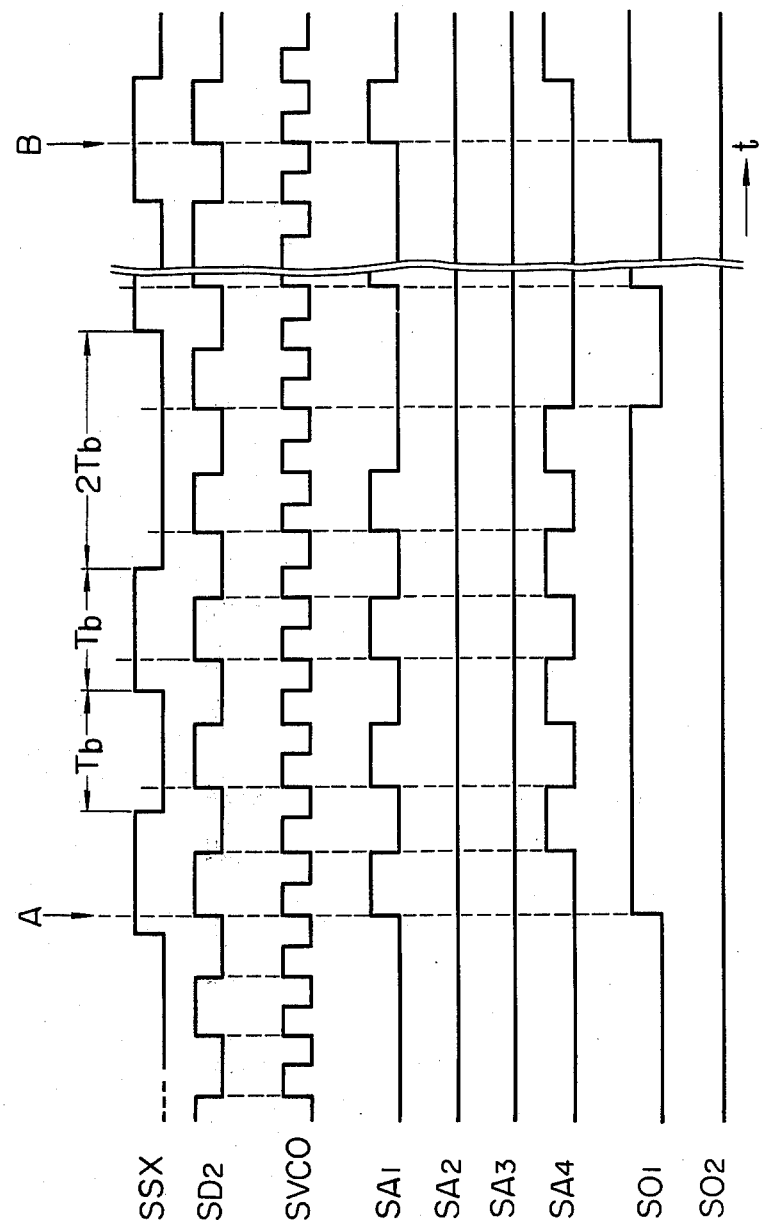

In FIG. 14 is shown the time chart for the process for progressively delaying the phase of the sampling clock pulse $SD_2$, which is initially shown as leading the data pulse SSX as indicated by the arrow A, so as to correctly synchronize it with the sampling clock pulse as indicated by the arrow B. That is, the output signal $SO_1$ from the first OR gate $O_1$ is repeatedly applied to the SLOW terminal of the oscillator VCO so that the sampling phase of the sampling clock pulse $SD_2$ is progressively delayed and finally correctly synchronized with the center of the data pulse SSX.

In FIG. 15 is shown the time chart of the process for progressively advancing the sampling phase of the sampling clock pulse $SD_2$, which is initially shown as being lagging behind the data pulse SSX as indicated by the arrow A', so as to correctly synchronize the former with the latter as indicated by the arrow B'. That is, the output signal $SO_2$ from the second OR gate $O_2$ is repeatedly applied to the FAST terminal of the oscillator VCO so that the phase of the sampling clock pulse $SD_2$ is progressively advanced and finally correctly synchronized as indicated by the arrow B'.

In summary, according to the present invention, contrary to the prior art systems, no differentiation is needed to obtain the zero-crossings; it is not necessary to increase the sampling frequency; no high Q filter is needed; the sampling frequency equal to two times of the baud rate of the incoming data pulse may suffice; and the zero-crossings may be detected not directly but indirectly. Thus there may be provided an accurate timing signal or data reproduction system which may easily digitalized and fabricated at low costs.

What is claimed is:

1. A system for providing a sampling clock reference signal for information encoded in a digital data signal having a given pulse repetition rate and pulse width, comprising:

means including a variable frequency or phase oscillator for sampling said digital data signal at successive time intervals determined by the frequency of the oscillator output signal, said frequency being on the order of twice said given pulse repetition rate, so that said sampling time intervals are on the order of one-half said digital data signal pulse width;

a shift register coupled to said sampling means for storing successive groups of samples of said digital data signal, each group comprising at least two successive samples thereof;

oscillator control means including a logic circuit for converting the pattern of digital data signal samples stored in said shift register into a control signal, the value of which is indicative of whether the phase of said digital data signal leads or lags the phase of said oscillator, said oscillator control means further including means for varying the frequency or phase of the output signal of said oscillator in accordance with said control signal so that the phase of said oscillator is maintained in coincidence with the phase of said digital data signals; and frequency divider means for synchronously dividing the frequency of the oscillator output signal in half to provide said sampling clock reference signal.

2. The system according to claim 1, wherein each of said groups of samples of said digital data signal comprises three successive samples thereof.

3. A timing data reproduction system as set forth in claim 2, wherein said sampling means includes a set-reset flip-flop having one input terminal, for receiving said digital data signal and another input terminal for receiving the oscillator output signal, the output of said flip-flop being connected to an input terminal of said shift register.

4. A timing data reproduction system as set forth in claims 1 or 2 or 3 wherein said oscillator control means comprises
   a first Exclusive-Or gate whose inputs are connected to an input terminal and a first output terminal of said shift register,
   a second Exclusive-Or gate whose inputs are connected to said input terminal and a second output terminal of said shift register,
   a first AND gate whose inputs are connected to the output of said first Exclusive-Or gate and the output terminal of said oscillator and whose output is connected to a SLOW terminal of said oscillator, and a second AND gate whose inputs are connected to the output terminal of said second Exclusive-Or gate and the output terminal of said oscillator and whose output terminal is connected to a FAST terminal of said oscillator.

5. A timing data reproduction system as set forth in claim 4 wherein the output terminal of said second Exclusive-Or gate is connected to a third input terminal of said first AND gate through a first inverter, and
   the output terminal of said first Exclusive-Or gate is connected to a third input terminal of said second AND gate through a second inverter.

6. A timing data reproduction system as set forth in claims 1 or 2 or 3 wherein said oscillator control means comprises
   a first Exclusive-Or gate whose first and second input terminals are connected to an input terminal and a first output terminal of said shift register,
   a second Exclusive-Or gate whose first and second input terminals are connected to said first output terminal and a second output terminal of said shift register,
   a third Exclusive-Or gate whose first and second input terminals are connected to said input terminal and said second output terminal of said shift register,
   a first three-input AND gate whose input terminals are connected to the output terminals of said first and third Exclusive-Or gates and the output terminal of said oscillator and whose output terminal is connected to a SLOW terminal of said oscillator, and
   a second three-input AND gate whose inputs are connected to the output terminals of said second and third Exclusive-Or gates and the output terminal of said oscillator and whose output terminal is connected to a FAST terminal of said oscillator.

7. A timing data reproduction system as set forth in claims 1 or 2 or 3 wherein said oscillator control means comprises
   a first Exclusive-Or gate whose input terminals are connected to an input terminal and a first output terminal of said shift register,
   a second Exclusive-Or gate whose input terminals are connected to said second output terminal and a second output terminal of said shift register, a third Exclusive-Or gate whose input terminals are connected to said input and second output terminals of said shift register, a first AND gate whose input terminals are connected to the output terminals, respectively, of said first and third Exclusive-Or gates, a second AND gate whose input terminals are connected to the output terminals, respectively, of said second and third Exclusive-Or gates, a first D flip-flop whose two input terminals are connected to the output terminals, respectively, of said first AMD gate and said oscillator and whose output terminal is connected to a SLOW terminal of said oscillator, and a second D flip-flop whose two input terminals are connected to the output terminals, respectively, of said second AND gate and whose output terminal is connected to a FAST terminal of said oscillator.

8. A timing data reproduction system as set forth in claim 6 wherein the output terminal of said first AND gate is connected to said FAST input terminal of said oscillator while the output terminal of said second AND gate is connected to said SLOW input terminal of said oscillator.

* * * * *